US012459155B2

(12) United States Patent
Garness et al.

(10) Patent No.: US 12,459,155 B2
(45) Date of Patent: Nov. 4, 2025

(54) LIGHT DUTY SAWHORSE

(71) Applicant: JS Products, Inc., Las Vegas, NV (US)

(72) Inventors: Richard Garness, Las Vegas, NV (US); James Stobar, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 1050 days.

(21) Appl. No.: 17/507,409

(22) Filed: Oct. 21, 2021

(65) Prior Publication Data

US 2022/0126478 A1 Apr. 28, 2022

Related U.S. Application Data

(60) Provisional application No. 63/104,491, filed on Oct. 22, 2020.

(51) Int. Cl.
*B25H 1/06* (2006.01)
*B27B 21/00* (2006.01)

(52) U.S. Cl.
CPC .................................... *B27B 21/00* (2013.01)

(58) Field of Classification Search
CPC .................................. B27B 21/00; B25H 1/06
See application file for complete search history.

(56) References Cited

U.S. PATENT DOCUMENTS

| | | | | |
|---|---|---|---|---|
| 3,637,045 A * | 1/1972 | Poffenbaugh | E04G 1/34 182/155 |
| 5,105,862 A | 4/1992 | Skinner et al. | |
| 5,836,365 A | 11/1998 | Derecktor | |
| 5,960,904 A | 10/1999 | Ullmann | |
| D471,287 S | 3/2003 | Sommerville et al. | |
| 6,681,895 B2 * | 1/2004 | Virtue | B25H 1/06 182/186.3 |
| D489,738 S | 5/2004 | Radermacher | |
| 6,745,804 B2 | 6/2004 | Welsh et al. | |
| 7,185,738 B1 * | 3/2007 | Clepper | B25H 1/06 182/155 |

(Continued)

FOREIGN PATENT DOCUMENTS

| | | |
|---|---|---|
| CN | 301699077 | 10/2011 |
| CN | 302685948 | 12/2013 |

(Continued)

OTHER PUBLICATIONS

Notice of Allowance and Search Report for ROC (Taiwan) Patent Application No. 110302068, mailed Nov. 12, 2021, 5 pages.

*Primary Examiner* — Amy J. Sterling
(74) *Attorney, Agent, or Firm* — Snell & Wilmer LLP

(57) ABSTRACT

A sawhorse has a first pair of legs connected to a first bracket, the first pair of legs comprising first and second legs which are independently movable relative to one another, a second pair of legs connected to a second bracket, the second pair of legs comprising third and fourth legs which are independently movable relative to one another, and a head connected to the first and second brackets and spacing the first and second pairs of legs from one another. The legs can be moved from an extended position to a retracted or collapsed position where they extend along and generally parallel to the head. The sawhorse includes a latching mechanism which allows it to be connected to a second sawhorse for storage and transport.

20 Claims, 7 Drawing Sheets

(56) References Cited

U.S. PATENT DOCUMENTS

| | | | | |
|---|---|---|---|---|
| 7,210,510 | B2 | 5/2007 | Barclay de Tolly | |
| 7,222,648 | B2 | 5/2007 | Liu et al. | |
| D549,749 | S | 8/2007 | Francis et al. | |
| D584,421 | S | 1/2009 | Wise | |
| 7,481,254 | B2 | 1/2009 | Welsh et al. | |
| D623,672 | S | 9/2010 | Francis et al. | |
| 8,528,870 | B2 | 9/2013 | Liu et al. | |
| 8,684,052 | B2 | 4/2014 | Breitenbach | |
| 9,221,168 | B2 | 12/2015 | Boyd | |
| 9,302,288 | B2 | 4/2016 | Waterston | |
| 9,557,000 | B2 | 1/2017 | Chang | |
| D842,015 | S | 3/2019 | Strempke et al. | |
| 10,252,410 | B2 | 4/2019 | Luis y Prado | |
| D872,877 | S | 1/2020 | Hanlon | |
| D882,824 | S | 4/2020 | Hanlon | |
| D899,629 | S | 10/2020 | Hanlon | |
| 10,864,625 | B2 | 12/2020 | Hanlon | |
| 11,926,033 | B2 * | 3/2024 | Omry | B25H 1/06 |
| 2010/0288585 | A1 | 11/2010 | Katz et al. | |
| 2018/0001467 | A1 * | 1/2018 | Ursell | B25H 1/06 |

FOREIGN PATENT DOCUMENTS

| | | |
|---|---|---|
| CN | 303660132 | 5/2016 |
| CN | 306111150 | 10/2020 |

* cited by examiner

LIGHT DUTY SAWHORSE

RELATED APPLICATION DATA

The present application claims priority to U.S. Provisional Application Ser. No. 63/104,491, filed Oct. 22, 2020, which application is incorporated herein in its entirety by reference.

FIELD OF THE INVENTION

The present invention relates to workpiece supports, such as sawhorses.

BACKGROUND OF THE INVENTION

A variety of work supports, such as for supporting items being worked upon with tools, are known. One well-known type of work support is a sawhorse. Sawhorses usually have a main beam that is supported by two pairs of legs. One common design of a sawhorse is made of 2×4 lumber, where one piece of 2×4 lumber forms the main beam and other 2×4 pieces form downwardly extending pairs of legs.

These conventional sawhorses provide very basic supporting functionality, such as enabling a user to support a sheet of plywood or long pieces of lumber between two sawhorses. However, the sawhorses have various limitations. One problem is that they are often heavy and difficult to move. They are also usually large in dimension, thus making them difficult to store.

An improved work support, such as of the sawhorse-style, is desired.

SUMMARY OF THE INVENTION

Embodiments of the invention comprise a work support, such as a sawhorse, and a method of using the sawhorse.

In one embodiment, the sawhorse has a first pair of legs connected to a first bracket, the first pair of legs comprising first and second legs which are independently movable relative to one another, and a second pair of legs connected to a second bracket, the second pair of legs comprising third and fourth legs which are independently movable relative to one another, and a head connected to the first and second brackets and spacing the first and second pairs of legs from one another. The legs can be moved from an extended position in which the head is supported in an elevated position, to a retracted or collapsed position where they extend along and generally parallel to the head.

In one embodiment, at least one locking mechanism allows a user to selectively lock the legs in their extended or retracted position.

The sawhorse may include one or more hooks or similar elements, such as extending from one or both brackets, such as for supporting lumber.

In one embodiment, when the legs are in their retracted position, they do not extend downwardly below the bottom of the brackets, such as first and second sides of the brackets.

In one embodiment, the sawhorse includes a latching mechanism which allows it to be connected to a second sawhorse for storage and transport. The latching mechanism may comprise a catch and a latch which can be moved into engagement with the catch. In one embodiment, two sawhorses in their retracted position may be oriented so that the legs thereof face one another, and the sawhorses may then be connected.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a work support, such as a sawhorse. The sawhorse may be referred to as a "light duty" sawhorse in that it is configurated to be lightweight and compact in its collapsed position.

Figure 1:
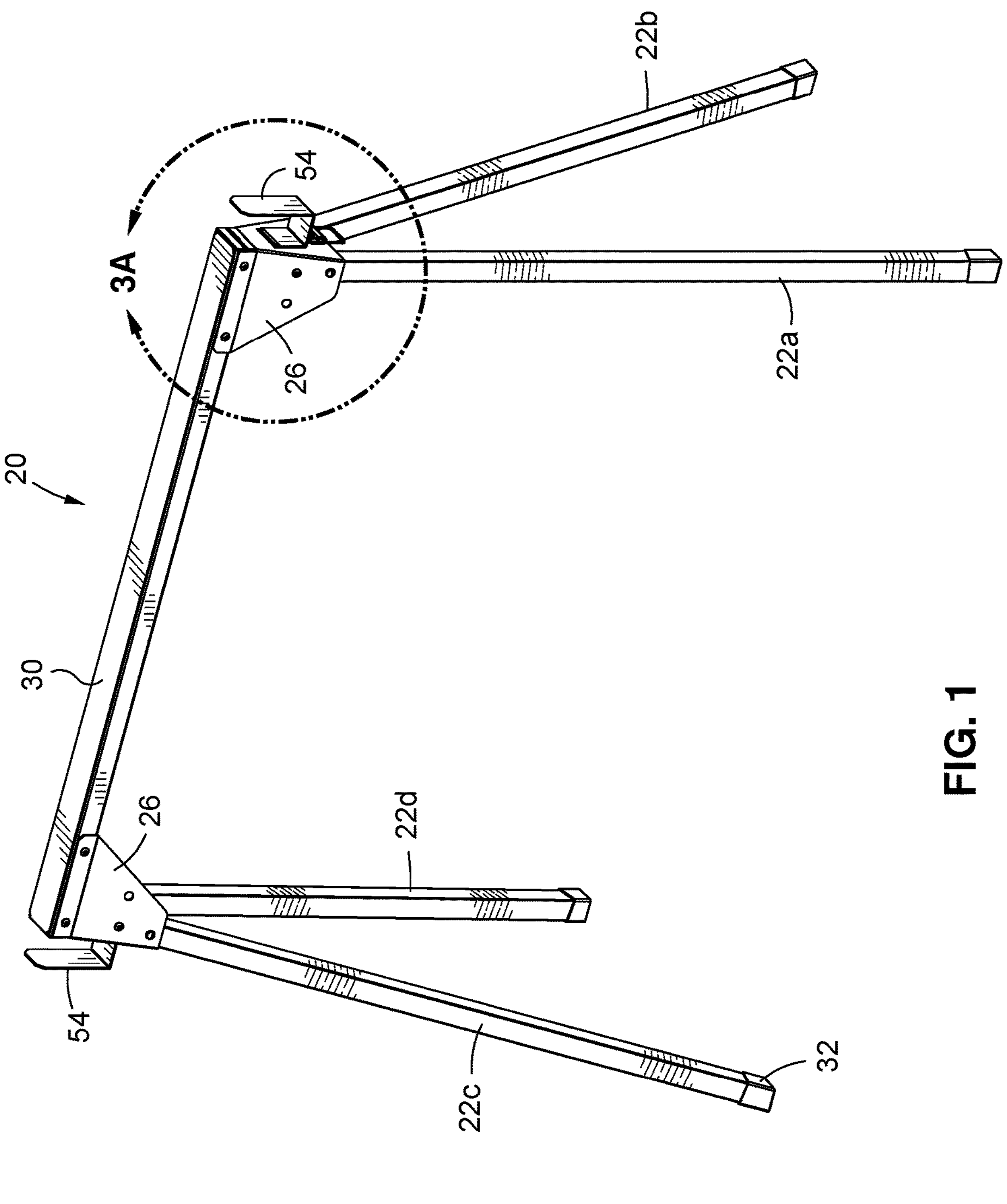
FIG. 1 is a perspective view of a sawhorse in accordance with an embodiment of the invention.

As illustrated in FIG. 1 a sawhorse 20 has two pair of legs 22*a,b* and 24*a,b* (e.g. the first pair of legs comprising a first leg 22*a* and a second leg 22*b* and the second pair of legs comprising a third leg 24*a* and a fourth leg 24*b*). Each pair of legs 22*a,b* and 24*a,b* is connected at a top end to a bracket 26*a,b*. A cross-member or head 30 is preferably connected to, and extends between, the two brackets 26*a,b*

In one embodiment, each leg 22*a,b*, 24*a,b* has a top end and a bottom end. The legs 22*a,b*, 24*a,b* may have various configurations, but in one embodiment, are designed to be relatively lightweight, such as by being constructed from 1×1 to 2×2 inch square metal tubing. In one embodiment, a foot 32 is located at the bottom end of each leg 22*a,b*, 24*a,b*. The foot 32 may comprise a cap or similar member which is located over for fits within and extends from the bottom end of each leg, where the cap may be constructed of rubber, plastic or a similar durable material.

Figure 2:
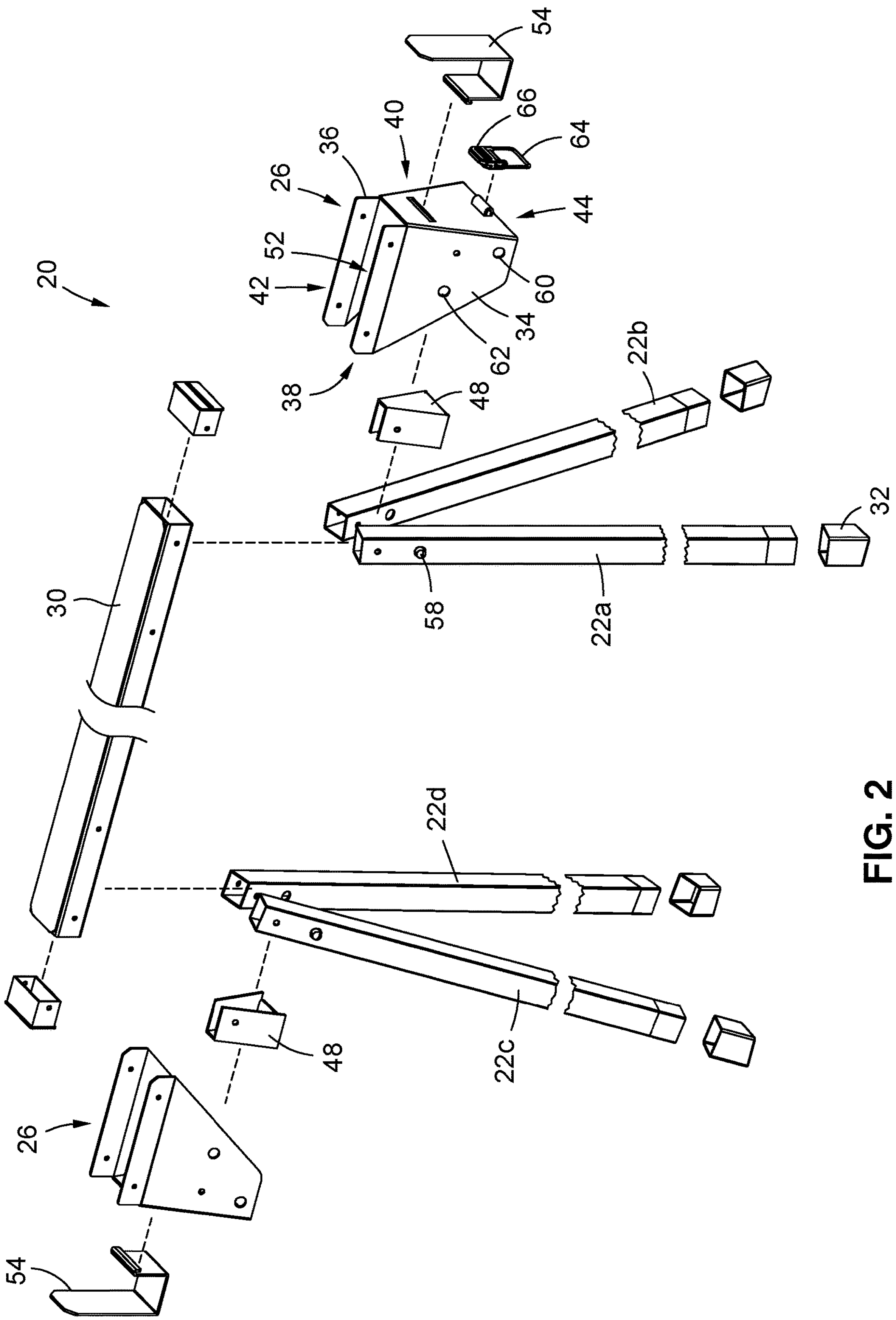
FIG. 2 is an exploded view of the sawhorse illustrated in FIG. 1.

As indicated, the top end the first and second legs 22*a,b* are connected to one of the brackets 26*a*, and preferably movably connected thereto. As best illustrated in FIG. 2, the two brackets 26*a,b* may each have a first side 34, a second side 36, a front 38, a rear 40, a top 42 and a bottom 44. In one embodiment, the first leg 22*a* is connected to a first side 24 of the bracket 26*a*, and the second leg 22*b* is connected to the second side 36 of the bracket 26*a*, and below the head 30 (e.g. generally at the bottom 44 of the bracket 26*a* and at an inside of each side 34,36). The first and second legs 22*a,b* are preferably independently movable relative to one another in a manner which permits the legs 22*a,b* to rotate between an open or extended position and a closed or retracted position. In one embodiment, the legs 22*a,b* are connected to the bracket 26*a* by a pin 46 or similar member, which permits each leg 22*a,b* to rotate relative to the bracket 26*a*.

As illustrated in FIG. 2, the bracket 26*a* may include a guide 48. The guide 48 may be positioned between the first and second legs 22*a,b*, such as for providing lateral support to the top ends of the first and second legs 22*a,b*, particularly when they are in their extended position. As illustrated, the guide 48 may be wedge shaped, thus defining sloping faces which engages sides of the first and second legs 22*a,b.*

The second pair of legs (e.g. the third and fourth legs) 28*a,b* is similarly connected to the second bracket 26*b.*

In one embodiment, the front 38 of each bracket 26*a,b* is generally opening, thus permitting the pairs of legs 22*a,b*, 24*a,b* to rotate towards one another to their retracted or collapsed position. In one embodiment, the rear 40 of each bracket 26*a,b* is generally closed and may thus serve as a stop which limits rotation of the legs 22*a,b*, 24*a,b* towards their open or extended position, and also provide a location for mounting of other elements, as described below.

In one embodiment, the top 42 of the head 30 may define a channel 52 which is partially inset between the first and second sides 34,36. The channel 52 may extend from the front 38 of the bracket 26*a,b* towards the rear 40, such as entirely through the bracket 26*a,b*.

In the embodiment illustrated, the head 30 may comprise a generally low-profile body, such as having a rectangular cross-section (such as of tubing), where a width of the head 30 may be greater than a height thereof. The head 30 has a first end and a second end, where the first end is located in the channel 52 of one bracket 26*a*, and the second end is located in the channel 52 of the other bracket 26*b*. In one embodiment, the depth of the head 30 is generally the same as the depth of the channel 52, so that the top of the head 30 is at (e.g. generally flush with) the top 42 of each bracket 26*a,b*. In one embodiment, the head 30 may be connected to each bracket 26*a,b* with one or more fasteners, such as extending through the side(s) 34,36 of the brackets 26*a,b*. In one embodiment, the head 30 might be removeable.

The head 30 separates the brackets 26*a,b* and thus the pairs of legs 22*a,b*, 24*a,b*. The length of the head 30 may vary, such as depending on the desired size of the sawhorse 20.

Figure 3B:
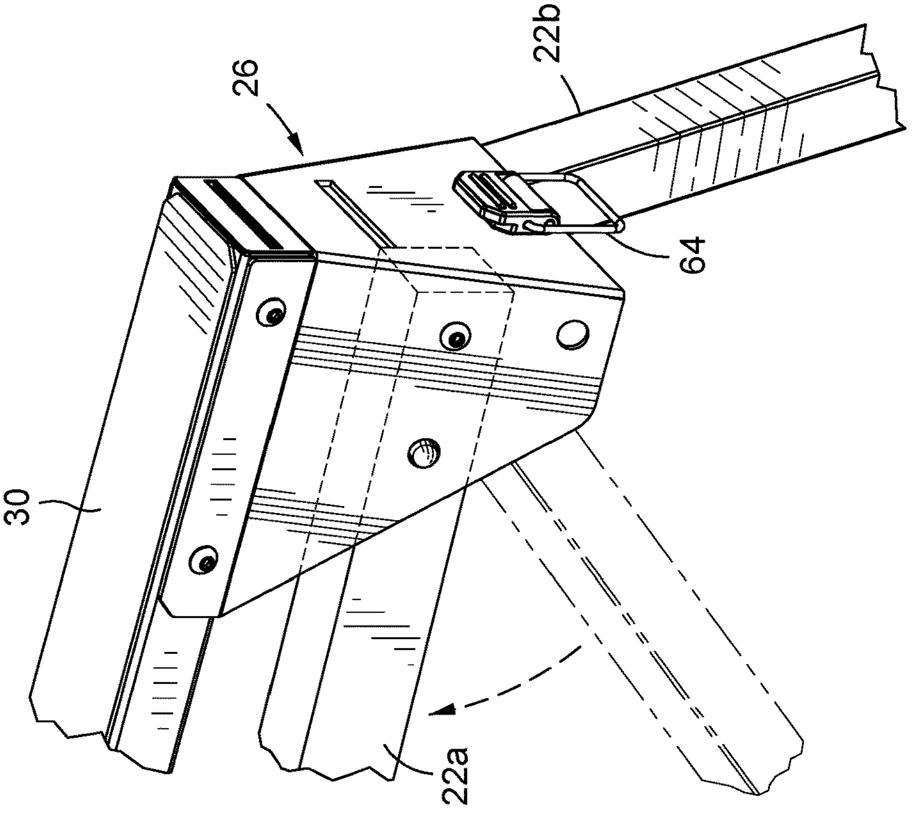
FIGS. 3A and 3B are enlarged views of one end of the sawhorse illustrated in FIG. 1.
Figure 3A:
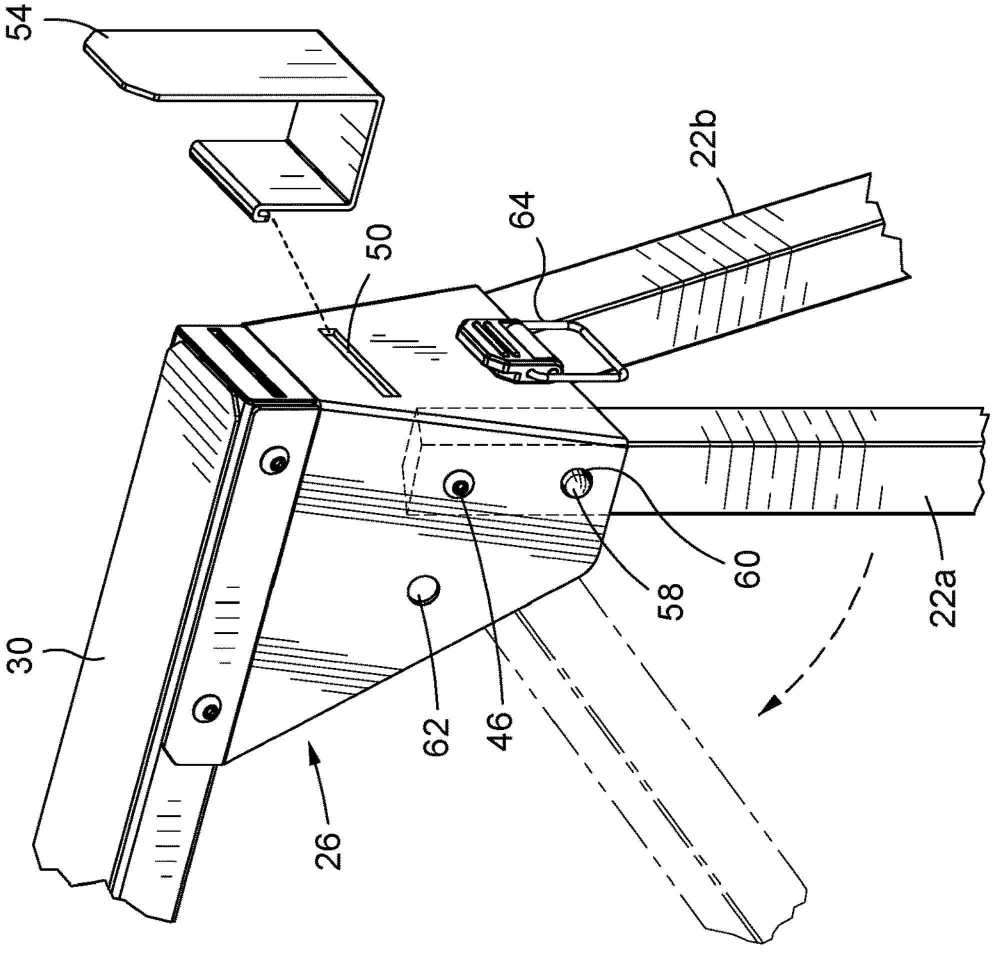
Figure 4:
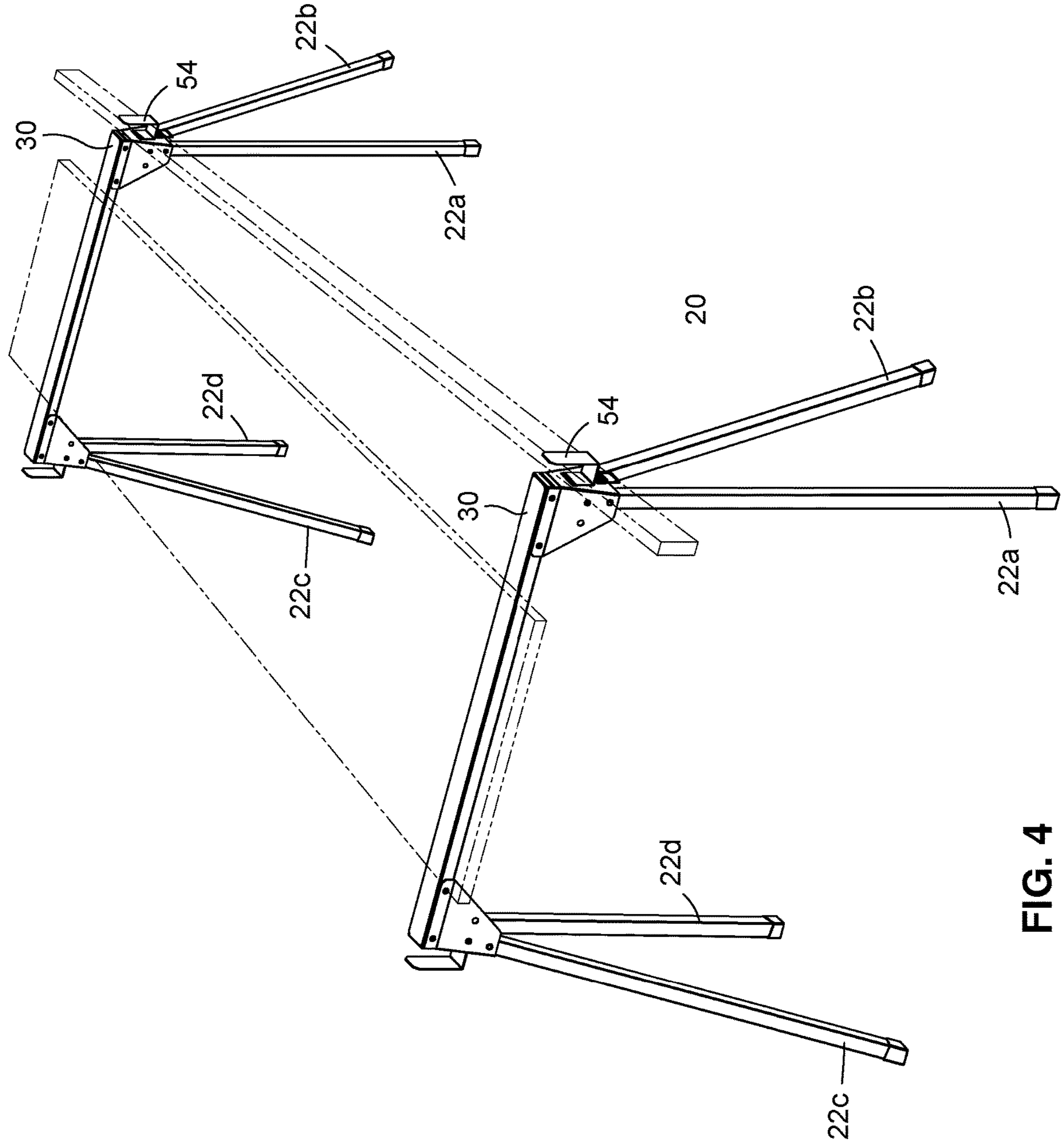
FIG. 4 illustrates an aspect of using a sawhorse of the present invention to support one or more workpieces.

As illustrated in FIGS. 2 and 3A, a hook or similar support 54 may be located at either or both ends of the sawhorse 20. The hooks 54 might comprise, for example, a generally "U" shaped bracket which is designed to support a 2×4 (whereby the width of the bracket may be 1.5-2 inches). In one embodiment, the hooks 54 may be mounted to the rear 40 of the brackets 26*a,b*. The hook 54 might be connected to the bracket 26*a,b* via an outwardly extending flange which fits into a slot 50 in the bracket 26*a,b* (such as to be easily removable therefrom, such as when transporting or storing the sawhorse 20). As illustrated in FIG. 4, the sawhorse 20 of the invention may be used to support one or more workpieces, such as when used with a second sawhorse 20. For example, one or more workpieces might be supported on the head 30 or by the hook 54.

Figure 5:
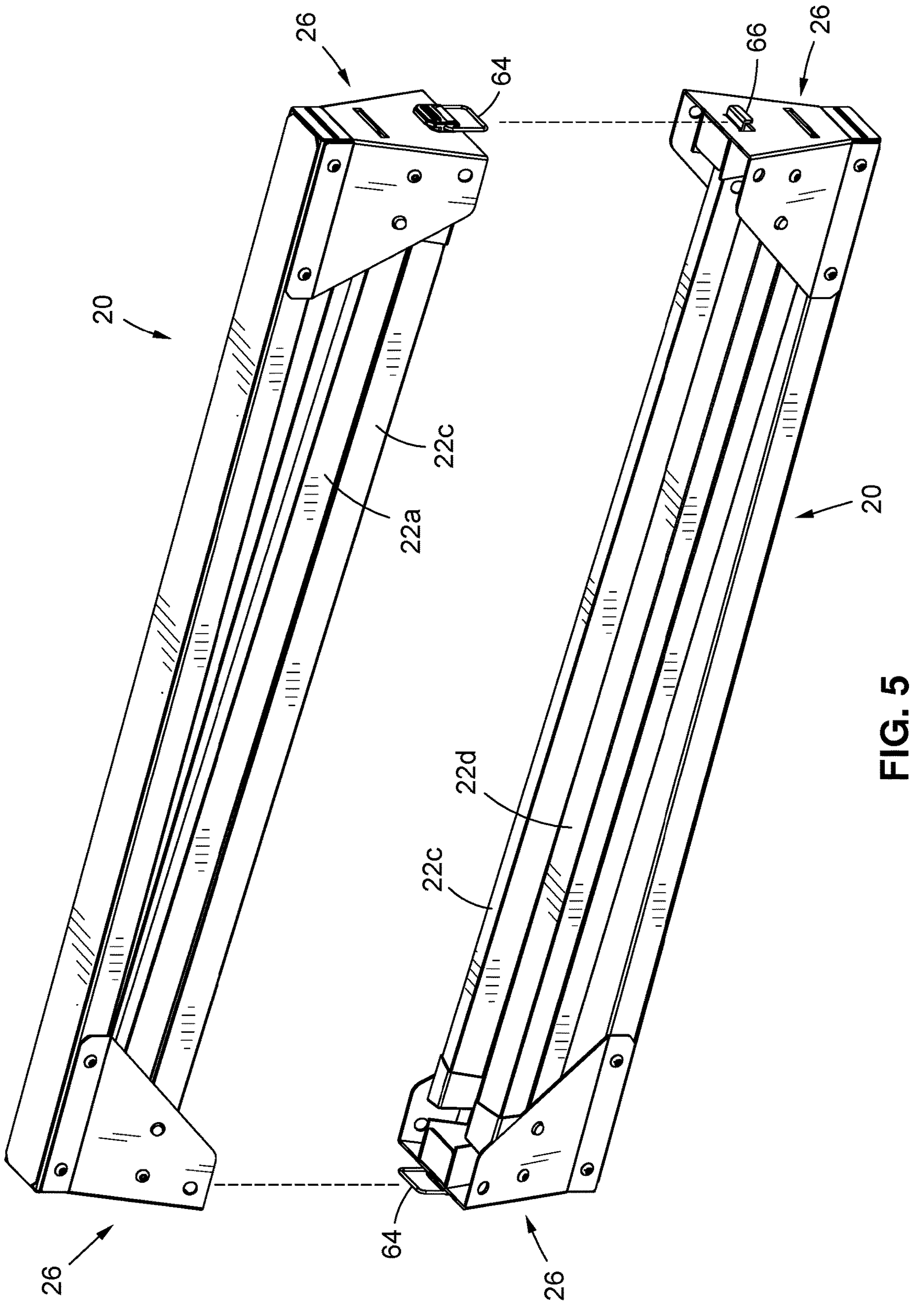
FIGS. 5-7 illustrate connection of two sawhorses two one another, such as for storage or transport.
Figure 6:
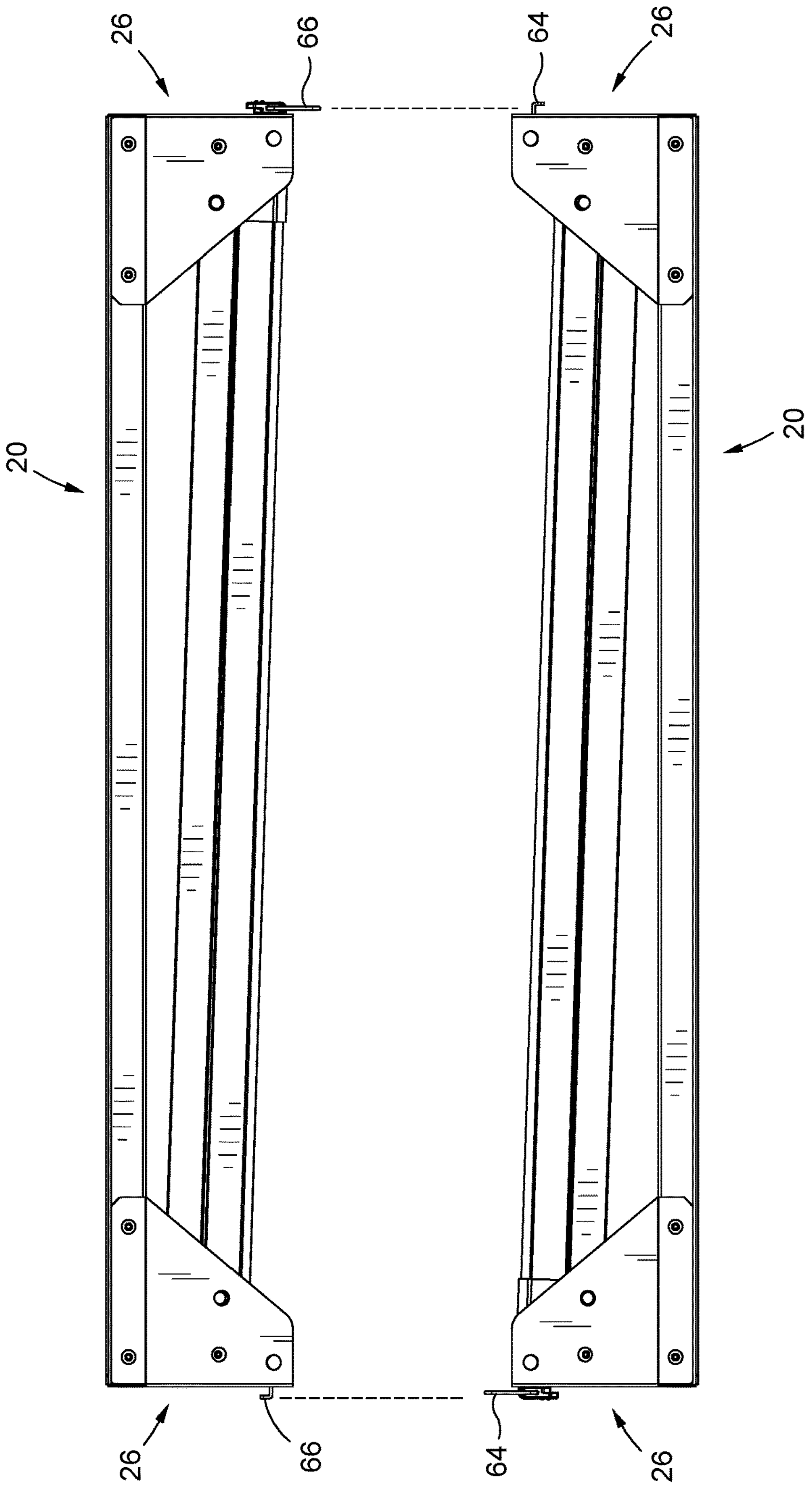

As indicated above and illustrated in FIGS. 3A and 3B, the pairs of legs 22*a,b*, 24*a,b* may be moved between an open or extended position (for supporting the head 30 in a raised position above a surface or support) and a closed or retracted position. In the closed or retracted position, the pairs of legs 22*a,b*, 24*a,b* may fold inwardly so that they extend generally parallel to and along the bottom of the head 30, as best illustrated in FIGS. 5-6.

In one embodiment, at least one locking or securing means are provided for securing the legs 22*a,b*, 24*a,b* in their open and/or closed positions. In one embodiment, and referring to FIGS. 2 and 3A-3B, a locking mechanism may be provided relative to each leg. The locking mechanism may comprise a biased pin 58 which is associated with each leg 22*a,b*, 24*a,b*, such as being located partially within each leg, where a spring or other biasing element (not shown) biases the pin outwardly from the leg, such as through an aperture therein, and where the pin 58 can be pressed inwardly into a compressed or retracted position.

The sides 34,36 of the brackets 26*a,b*, preferably define a first opening 60 and a second opening 62. The first opening 60 is positioned so that when the corresponding leg 22,*a,b*, 24*a,b* is moved to its open or extended position, the pin 58 associated with that leg is biased outwardly and extends through the opening 60, thus effectively locking or retaining the leg in its open position. The second opening 62 is positioned so that when the corresponding leg 22*a,b*, 24*a,b* is moved to its closed or retracted position, the pin 58 associated with that leg is biased outwardly and extends through the opening 62, thus effectively locking or retaining the leg in its closed position. The user may release the legs 22*a,b*, 24*a,b* from their locked positions by pressing the pins 58 inwardly.

Other means for locking might be used, such as fasteners, clips, latches and the like.

Figure 7:
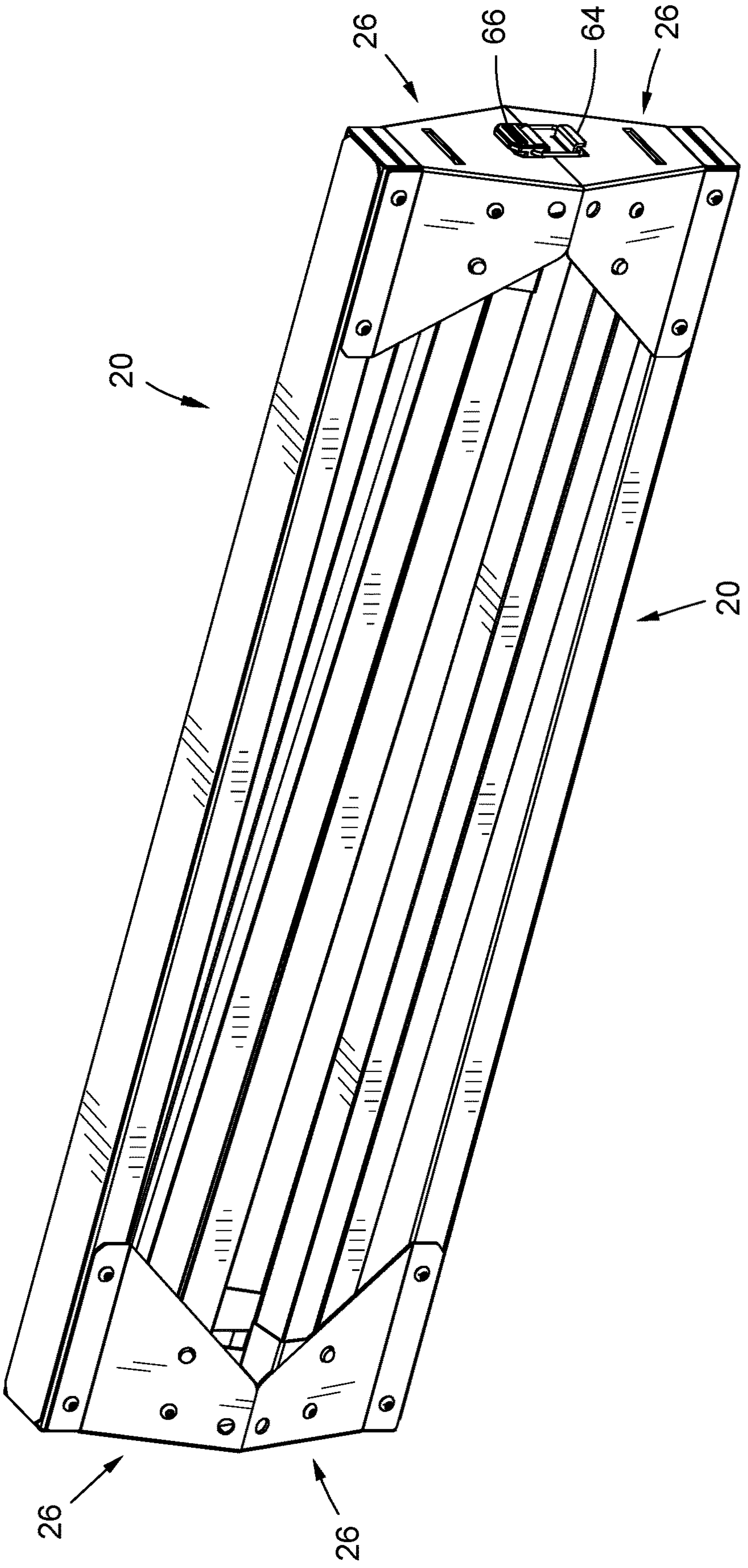

In one embodiment, means are provided for joining or connecting two sawhorses 20 of the invention when the legs thereof are in the retracted or collapsed position. As best illustrated in FIGS. 5-7 this means may comprise a movable latch 64 and a catch 66. As illustrated, a movable latch 64, such as a lever-operated capture or hook, is located at an end of one of the brackets 26*a,b*, and a catch 66, such as a catch block, is located at an end of the other bracket 26*a,b*. Two sawhorses 20 may be located proximate to one another in reverse orientation, so that the latch 64 on one sawhorse can be engaged with the catch 66 on the other, and vice versa. So connected, the two sawhorses 20 may be easily transported or stored or the like.

In a preferred embodiment, as illustrated, when the legs 22*a,b*, 24*a,b* are moved to their retracted position, they extend generally along and parallel to the head 30. Further, they do not extend below the bottom of the sides 34,36 of the brackets 26*a,b*. Thus, when two sawhorses are connected, as illustrated in FIGS. 5-7, the legs are captured or contained between the heads 30 and associated brackets 26*a,b*, such as with the heads 30 facing outwardly and the bottoms of the sides 34,36 of the brackets 26*a,b* of the two sawhorses 20 engaging one another.

The sawhorse of the invention has numerous advantages. One advantage is a lightweight sawhorse which is easy to use, transport and store. In one embodiment, when the legs of the sawhorse are moved to their closed position, they fold along the head of the sawhorse and extend parallel thereto, such that the sawhorse has a compact dimension in its collapsed position. Further, two sawhorses may be connected to one another so that they can be transported and/or stored together.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A sawhorse comprising:

a first bracket having a top and defining a first channel recessed into said top;

a second bracket having a top and defining a second channel recessed into said top;

a first pair of legs connected to said first bracket, said first pair of legs comprising a first leg movably connected to said first bracket and a second leg movably connected to said first bracket, said first and second legs movable independently from one another;

a second pair of legs connected to said second bracket, said second pair of legs comprising a third leg movably connected to said second bracket and a fourth leg movably connected to said second bracket, said third and fourth legs movable independently from one another; and a head fixedly connected to said first and second brackets within said first channel and said second channel and spacing said first and second pairs of legs from one another.

2. The sawhorse in accordance with claim 1, wherein said first, second, third and fourth legs are each movable between an extended position in which said legs extend downwardly from said first and second brackets to support said head in an elevated position and a retracted position in which said legs extend generally parallel to said head.

3. The sawhorse in accordance with claim 1, wherein said first and second brackets each have first and second sides having a bottom and wherein in said retracted position said first, second, third and fourth legs do not extend below said bottom of said sides of said brackets.

4. The sawhorse in accordance with claim 2, including a locking mechanism for selectively retaining said first, second, third and fourth legs in said extended and said retracted position.

5. The sawhorse in accordance with claim 4, wherein said locking mechanism comprises a biased pin associated with each of said first, second, third and fourth legs, said biased pin of each of said legs configured to engage a first opening or a second opening in said first or second bracket.

6. The sawhorse in accordance with claim 5, wherein said first opening and said second opening are provided in each of a first side and a second side of each of said first and second brackets.

7. The sawhorse in accordance with claim 1, wherein a first end of said head is located and terminates within said first channel and a second end of said head is located and terminates within said second channel.

8. The sawhorse in accordance with claim 1, wherein said corresponding channels are open-faced channels such that a top of said head is flush with the top of said first bracket and the top of said second bracket.

9. The sawhorse in accordance with claim 1, wherein said first bracket comprises a first guide which separates said first and second legs and said second bracket comprises a second guide which separate said third and fourth legs.

10. The sawhorse in accordance with claim 1, further comprising a hook coupled to located at an end of at least one of said first bracket and said second bracket via an outwardly extending flange inserted into a slot of said end.

11. The sawhorse in accordance with claim 2, wherein each of said first bracket and said second bracket have a rear plate, a first side plate, and a second side plate.

12. The sawhorse in accordance with claim 11, wherein, when in said extended position, said head is disposed within a longitudinal boundary defined by said rear plates.

13. The sawhorse in accordance with claim 12, wherein, when in said elevated position and said retracted position, said head, said first pair of legs, and said second pair of legs are disposed within said longitudinal boundary defined by said rear plates.

14. The sawhorse in accordance with claim 12, wherein, when in said elevated position and said retracted position, said head, said first pair of legs, and said second pair of legs are disposed within a lateral boundary defined by said first side plates and said second side plates.

15. The sawhorse in accordance with claim 12, wherein, when in said elevated position and said retracted position, said rear plates define longitudinal boundaries of said sawhorse and said first side plates and said second side plates define lateral boundaries of said sawhorse.

16. The sawhorse in accordance with claim 11, further comprising a latching mechanism configured to engage a latching mechanism of a second sawhorse to connect said sawhorse to said second sawhorse when said first and second pairs of legs are in a retracted position in which they extend generally parallel to said head.

17. The sawhorse in accordance with claim 16, wherein said latching mechanism of said sawhorse is disposed on said rear plates.

18. The sawhorse in accordance with claim 16, wherein said latching mechanism of said sawhorse includes a catch disposed on said rear plate of said first bracket and a movable latch disposed on said rear plate of said second bracket.

19. A pair of sawhorses comprising:

a first sawhorse comprising:

a first pair of legs connected to a first bracket, said first pair of legs comprising a first leg movably connected to said first bracket and a second leg movably connected to said first bracket, said first and second legs movable independently from one another;

a second pair of legs connected to a second bracket, said second pair of legs comprising a third leg movably connected to said second bracket and a fourth leg movably connected to said second bracket, said third and fourth legs movable independently from one another;

a first head connected to said first and second brackets and spacing said first and second pairs of legs from one another; and a first locking element associated with said first bracket and a second locking element associated with said second bracket;

wherein said first pair of legs and said second pair of legs are movable from an extend position to a retracted position in which said first and second pairs of legs extend generally parallel to said first head;

and a second sawhorse comprising:

a third pair of legs connected to a third bracket, said third pair of legs comprising a fifth leg movably connected to said third bracket and a sixth leg movably connected to said third bracket, said fifth and sixth legs movable independently from one another;

a fourth pair of legs connected to a fourth bracket, said fourth pair of legs comprising a seventh leg movably connected to said fourth bracket and an eighth leg movably connected to said fourth bracket, said seventh and eighth legs movable independently from one another;

a second head connected to said third and fourth brackets and spacing said third and fourth pairs of legs from one another; and a third locking element associated with said third bracket and a fourth locking element associated with said fourth bracket;

wherein said third pair of legs and said fourth pair of legs are movable from an extend position to a retracted position in which said third and fourth second pairs of legs extend generally parallel to said second head;

and wherein said first and second sawhorses are connectable in a stacked arrangement when said first, second, third and fourth pairs of legs are in their retracted positions and said first and second heads facing in opposing directions via engagement of said first and third locking elements and said second and fourth locking elements.

20. The pair of sawhorses in accordance with claim 19, wherein said first locking element comprise a latch and said second locking element comprises a catch, and said third locking element comprises a catch and said fourth locking element comprises a latch.

* * * * *